United States Patent [19]

Hess, Jr.

[11] 3,963,974
[45] June 15, 1976

[54] POWER SUPPLY CIRCUIT

[75] Inventor: William Emil Hess, Jr., Piscataway, N.J.

[73] Assignee: Bell Telephone Laboratories, Incorporated, Murray Hill, N.J.

[22] Filed: Jan. 29, 1975

[21] Appl. No.: 544,960

[52] U.S. Cl. .............................. 321/2; 321/45 R; 331/113 R
[51] Int. Cl.² ..................................... H02M 3/335
[58] Field of Search ..................... 321/2, 18, 45 R; 331/113 R, 113 A

[56] References Cited
UNITED STATES PATENTS

| 2,959,745 | 11/1960 | Greig | 321/2 X |
| 3,297,954 | 1/1967 | Wiley | 331/113 R |
| 3,361,952 | 1/1968 | Bishop | 321/45 R |
| 3,753,076 | 8/1973 | Zelina | 321/45 R |

OTHER PUBLICATIONS

Davidson et al., "Square-wave Oscillator Circuit", IBM Technical Discosure Bulletin, vol. 14, No. 11, Apr., 1972, p. 3548, S 2767-0303.

Primary Examiner—A. D. Pellinen
Attorney, Agent, or Firm—H M Shapiro

[57] ABSTRACT

A power supply circuit, suitable for powering a magnetic bubble memory from a remote central office over the telephone subscriber loop, employs a multivibrator arranged to provide a constant a-c current output regardless of voltage and impedance variations on the line. A plurality of rectifier-capacitor circuits is responsive to the output of the multivibrator to supply different output voltages at levels higher than those available at the telephone station set.

5 Claims, 3 Drawing Figures

POWER SUPPLY CIRCUIT

BACKGROUND OF THE INVENTION

It is well known that a variety of apparatus is available for attachment (or coupling) to a telephone station set for operation as an adjunct thereto. The typical situation requires that such apparatus be powered separately. That is to say, some auxiliary power supply, other than power available over the telephone loop is necessary for powering the apparatus.

Power may be supplied by provision of a convenience outlet for connection to the customer-supplied 110 volt service. But the provision of a convenience outlet usually requires structural modification of the customers' premises at considerable expense. Alternatively, battery power may be made available. But this also requires additional cost as well as provision for periodic replacement. Obviously, power from the central office over the telephone loop is a preferred alternative.

Although equipment is available for station set adjunct operation with very low power requirements, the properties of the telephone loop are so varied that it is difficult to provide adequate power in a commercially acceptable manner. To be specific, the voltage available at a station set varies with the length of the loop from the station set to the associated central office and in a worst case provides only a 2.8 voltage drop at the system design minimum of 23 milliamperes through the network at the station set. The voltage available at the set is insufficient in most cases to provide useful power levels directly. Further, voltage surges appear on the loop due, for example, to lightning.

BRIEF DESCRIPTION OF THE INVENTION

The present invention is directed at a power supply circuit operative to supply constant voltages, higher than that available directly at a subscriber station set, to station set adjunct equipment. The supply is responsive to inputs from a telephone loop and is operative to deliver constant voltages in spite of the varying properties of, and regardless of surges in, the telephone loop to which it is connected.

The power supply, in an illustrative embodiment, employs a multivibrator including two transistors with the primary winding of a transformer connected between the collector terminals of the two transistors. The base electrodes of the transistors are connected across the secondary of the transformer. The negative line of the telephone loop is connected to the emitters of the transistors; the positive line being connected to center taps to the primary and secondary windings of the transformer. A constant-current diode connected between the center taps maintains constant the current in the transistor base circuit, and thus in the collector circuit. The base circuit is operative merely to switch current between the transistor bases. The base drive voltage is independent of the multivibrator oscillation amplitude which reflects variations in conditions of the telephone loop. The constant-current diode ensures that the power supply is totally independent of loop voltage and impedance and that no interference with audio signals results with within wide voltage and impedance limits dictated by the circuit parameters in a well-understood manner.

The multivibrator provides a constant a-c current output which is regulated to apply a constant d-c voltage to a capacitor circuit via a rectifier arrangement. A regulator circuit samples the capacitor voltage and adjusts the multivibrator in a manner to adjust the capacitor voltage if the capacitor voltage varies from a prescribed level.

A feature of this invention accordingly is a power supply circuit including a multivibrator of a configuration to provide a constant-current output in response to an input available over a telephone loop. The adjustment of the capacitor voltage by varying the input current to the capacitor circuit via a regulator is also considered an important feature of an embodiment of this invention.

DETAILED DESCRIPTION

Figure 1:
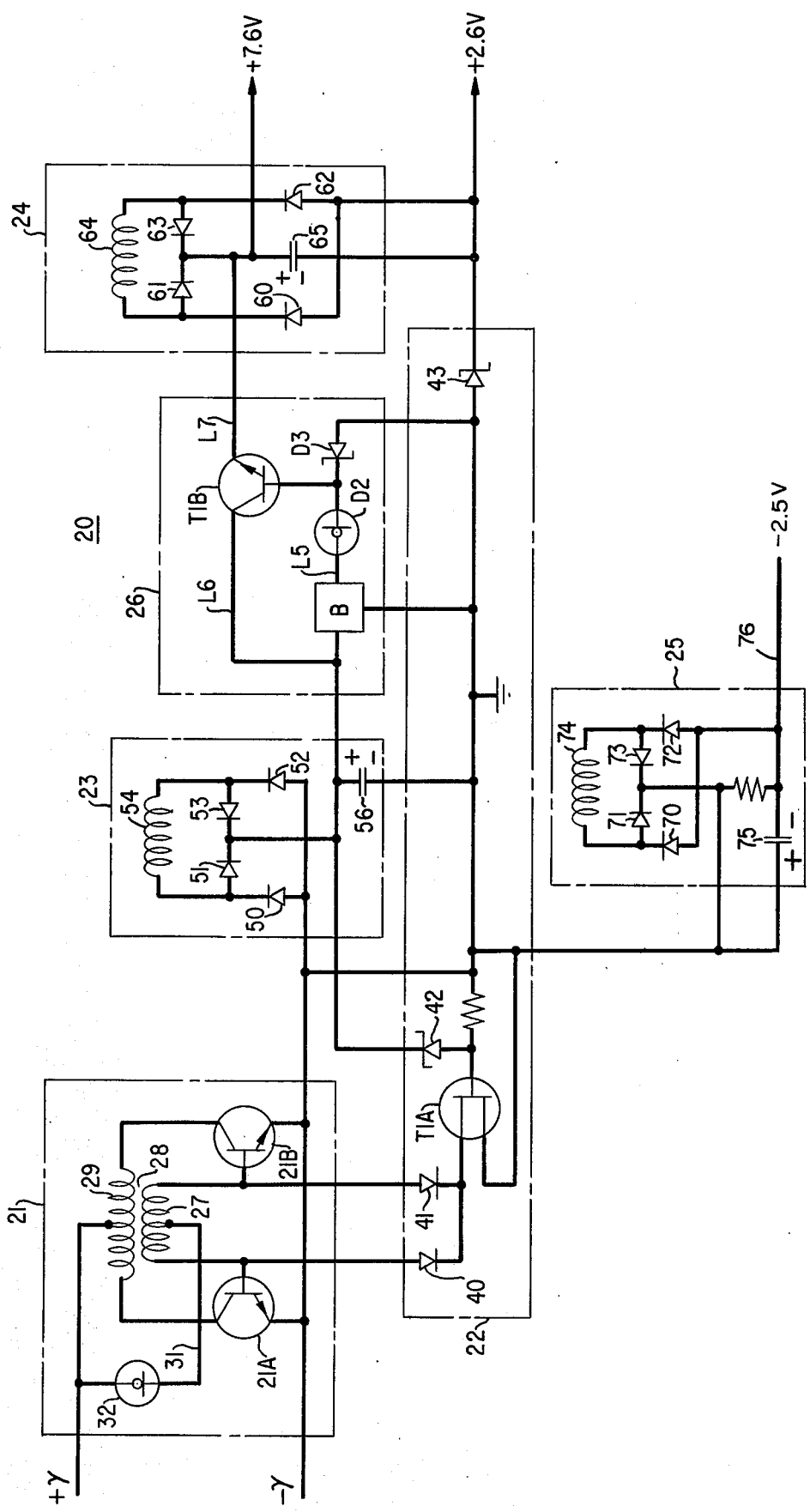
FIG. 1 is a circuit diagram of a power supply circuit embodiment of the present invention.

A schematic diagram of an illustrative power supply circuit 20 is shown in FIG. 1. The power supply is designed to respond to any of a variety of possible subscriber loop conditions to provide +7.6 volts, +2.6 volts and −2.5 volts in the illustrative embodiment. The power supply comprises six basic component circuits shown encompassed by broken block indications 21, 22, 23, 24, 25 and 26 in FIGS. 1 and 2. The circuit represented by block 21 is operative as a multivibrator, the circuits represented by blocks 22 and 26 are operative as regulator circuits. The (capacitor) circuits, represented by blocks 23, 24, and 25, are operative as rectified regulated stages or circuits to produce the +7.6 volts, +2.6 volts (−5 volts with respect to +7.6 volts) and −2.5 volts, respectively, necessary for the illustrative embodiment.

In general, circuits 21 and 22 operate to apply a regulated voltage to a parallel arrangement of the three capacitor circuits. In turn, the capacitor circuits supply requisite voltages to the control and drive circuits of, for example, a bubble repertory dialer as disclosed in copending application Ser. No. 443,960, filed Feb. 20, 1974 for A. H. Bobeck, Robert F. Fischer, Joseph E. Geusic, and Terence J. Nelson now Pat. No. 3,879,585. Relatively high, medium, and relatively low voltages are supplied by the three capacitor circuits, respectively. Circuit 22 provides a coarse (5%) regulation of the output supplied by (multivibrator) circuit 21. The highest value capacitor, in circuit 23, regulates the multivibrator through circuit 22 if the voltage of that capacitor varies. The medium voltage capacitor, in circuit 24, draws on the capacitor of circuit 23 if the value of the former changes thus causing circuit 21 to recharge the capacitor in circuit 24. The lowest value capacitor load is sufficiently low in value to be limited, in variation, by the turns ratio of the transformer coils with which it is coupled to the multivibrator circuit. Circuit 26 is operative as a precision (1%) regulator for the capacitor of the circuit 23.

In detail, the multivibrator circuit 21 comprises first and second transistors 21A and 21B, the base electrodes of which are connected across a secondary winding 27 of a transformer 28 as hown in FIG. 1. The collector electrodes of the transistors are connected to the primary winding 29 of the transformer. The emitters of the transistors are connected to the "common" or negative line of the telephone loop as indicated in the FIG. The negative line of the telephone loop is herein designated "common" because it corresponds to the circuit common of the illustrative power supply. Actually, the positive side of the telephone loop is usually the "common"; the lines are usually referred to as "tip" and "ring". The center taps of the primary and secondary windings of the transformer are interconnected by an electrical path 31 which includes a constant-current diode 32. The center tap of the primary winding of the transformer is connected to the positive side of the line as shown in the figure.

The multivibrator circuit is operative in the manner of conventional multivibrators, the circuit differing primarily in that the base current of the two transistors is determined by constant-current diode 32 in the feedback path 31 and is switched between the bases by the induced voltage in the secondary winding 27. The multivibrator circuit organization is such as to permit a variation in voltage at the primary center tap. The arrangement results in a constant base supply regardless of conditions on the telephone loop. The output of the multivibrator is supplied to the regulated circuits 23, 24, and 25 through secondaries of transformer 28 and the diodes of the regulated circuits.

The regulator circuit 22 comprises diodes 40 and 41, zener diodes 42 and 43, and enhancement mode field-effect transistor T1A. Diodes 40 and 41 are connected between the base electrodes of transistors 21A and 21B, respectively, in order to isolate the base regions of those transistors, and transistor T1A. The regulated (capacitor) circuit 23 comprises diodes 50, 51, 52, and 53 connected between opposite ends of a transformer secondary 54 and across diode 42 as shown in FIG. 1. A capacitor 56 is connected between the common line and diode 42. Diode 42 at regulation voltage, turns on transistor T1A and shunts the base drive from transistors 21A and 21B thus reducing the oscillation level of the multivibrator circuit to a point where capacitor 56 just maintains 11.5 volts. Otherwise, the voltage across the capacitor fluctuates to reflect the load or continues to charge until the circuit is limited by the line voltage.

The second regulated circuit 24 similarly includes diodes 60 and 61 and diodes 62 and 63 connected between opposite ends of a transformer secondary 64, and capacitor 65. Capacitor 65 is connected to the +7.6-volt output and is charged to −5 volts with respect to 7.6 volts. In operation, capacitor 65 just maintains voltage as does capacitor 56 because of the turns ratio of coils 54 and 64 thus avoiding fluctuations which reflect line conditions and load. Zener diode 43 allows current to be drained from capacitor 56 if capacitor 65 discharges somewhat to drop the −5 volt output below its nominal value. Diode 43 thus functions to avoid the discharge of capacitor 65 by discharging capacitor 56 slightly. This operation in turn, causes increased oscillation of transistors 21A and 21B, an increase in the constant a-c current output, and the recharging of capacitors 56 and 65.

Regulated (capacitor) circuit 25 includes diodes 70 and 71 and diodes 72 and 73 connecting opposite sides of secondary 74 across capacitor 75 as shown. The circuit is driven from secondary 74 of transformer 28 in a manner similar to that described above. Capacitor 75 is charged to 2.5 volts. Its positive terminal is connected to the common line providing −2.5 volts at output 76. The turns ratio of secondary 74 and secondary 54 is sufficient to provide the regulation due to the low capacitance load.

Base bias to transistors 21A and 21B of the multivibrator circuit is provided by constant current diode 32 which drives the center tap of the secondary winding 27. Since the diode is a constant-current generator, the induced voltage in the secondary winding switches the constant current between the transistor bases. This feedback arrangement is an important feature herein being operative to limit the collector current in the transistors 21A and 21B to a level which prevents unacceptable loading on the telephone loop and ensures proper operation of the power supply over the field range of customer loop lengths.

Diode 42 is a voltage reference diode which conducts when capacitor 56 reaches +11.5 volts and activates transistor T1A. Transistor T1A shunts the base drive current from the transistors 21A and 21B through isolation diodes 40 and 41 to a level to just maintain the +11.5 volts. If capacitor 65 is discharged below −5 volts, diode 43 conducts thus reducing the voltage on capacitor 56. This voltage reduction, again, feeds back to the multivibrator circuit causing the oscillations of the multivibrator and the constant a-c current output thereof to increase and, thus, causing the capacitors to recharge.

Circuit 26 comprises a transistor T1B, the base electrode of which is connected via zener diode D3 to the common line and via a constant-current diode D2 to a voltage level detector represented by block B. Detector B is connected between the capacitor (56) voltage and the common line as shown in the figure. Detector B switches on when capacitor 56 reaches sufficient voltage to power the circuit. When B is on, lead L5 is connected to lead L6 powering the regulator which produces 7.6 volts at lead L7. Regulated (capacitor) circuit 26 provides the +7.6 volts required and is switched on when capacitor 56 reaches a usable level.

Figure 2:
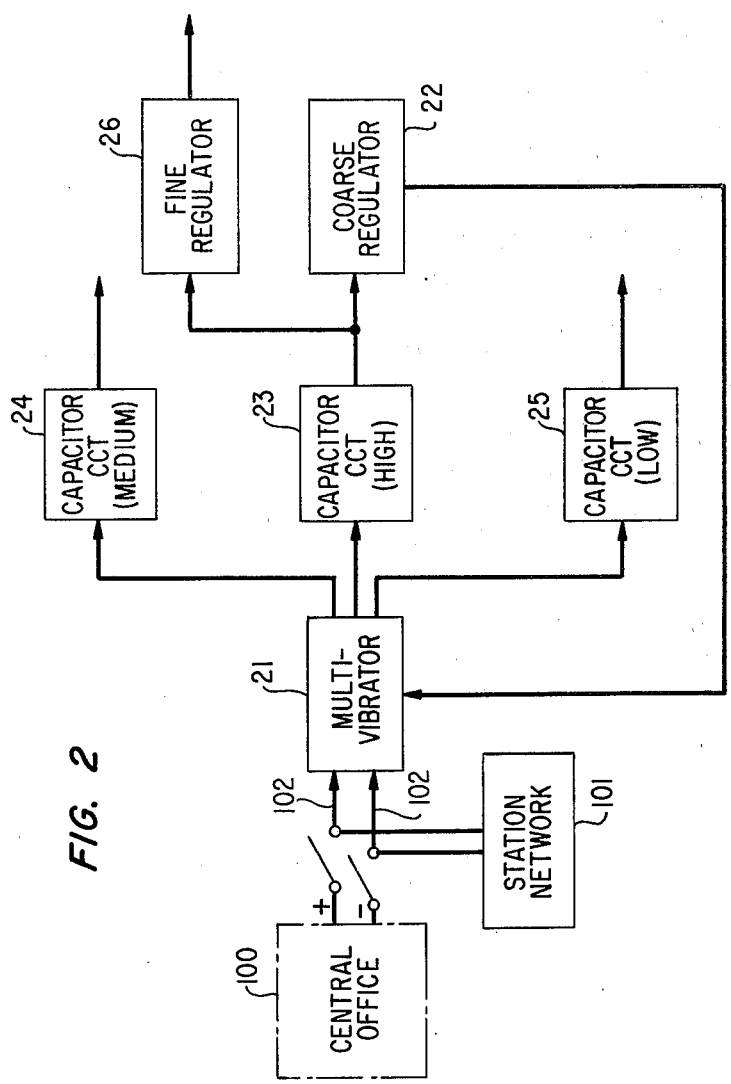
FIG. 2 is a block diagram of the power supply of FIG. 1.

FIG. 2 shows a simplified block diagram of the circuit arrangement of FIG. 1 omitting the various circuit elements. It should be clear that multivibrator 21, responsive to a voltage on a telephone loop, applies a regulated output to capacitor circuits 23, 24, and 25. Regulator 22 controls circuit 21 in response to the voltage stored in circuit 23 (i.e., capacitor 56) providing constant voltage outputs. Capacitor circuit 23 applies an output to the fine regulator 26, the latter providing constant voltage output in response.

Figure 3:
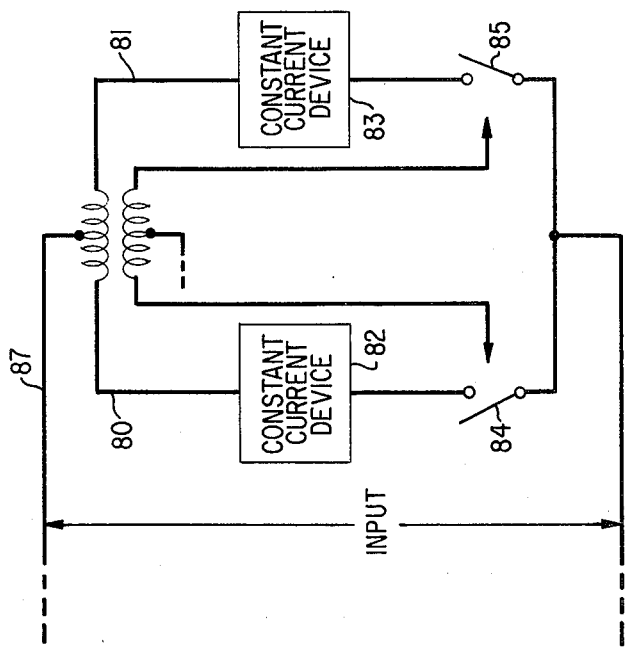
FIG. 3 is a schematic representation of a generalized circuit arrangement operative in accordance with the principles of the invention.

In principle, the circuit of FIG. 1 is operative as a pair of electrical paths each including a constant-current device and a switch connected across the primary winding of a transformer. This arrangement is shown in FIG. 3 where electrical paths 80 and 81 include constant-current devices 82 and 83 and switches 84 and 85, respectively. Input voltage is applied between the center tap to the primary winding and the switches.

In addition, provision is made to switch the switches in the alternative. If a transistor operating in the linear (nonsaturated or constant-current) mode is employed as both a constant-current device (or arrangement) and a switch in each electrical path of FIG. 3, the alternative operation of the transistors is easily achieved by means of the secondary winding of the transformer. Specifically, the base electrodes of the transistors are connected across the secondary winding, and the positive line, 87 in FIG. 3, is also connected to the center tap of the secondary winding through constant-current diode connected between the primary and secondary center taps (32 of FIG. 1) to ensure proper operation. An a-c constant current is produced in operation.

In the circuit of FIG. 1, the a-c output is applied to the capacitor circuits via transformer couplings as discussed hereinbefore. In theory, each capacitor circuit charges to infinity. But the constant-current source is varied to prevent this result. In practice, coarse regulator 22 is operative to reduce the current provided by circuit 21 until load losses in the capacitor circuit are just compensated for by circuit 21 at a predetermined voltage across capacitor 56.

The power supply has the additional advantage that as a constant-current device, it represents an infinite impedance to the telephone loop and thus interferes only negligibly with audio signals thereon.

The illustrative power supply is connected, electrically in parallel, with the telephone station set as disclosed in the above-mentioned copending patent application. As described in that application, power is applied to the power supply of FIG. 1 responsive to the removal of a telephone receiver from its cradle and the closure of an associated hookswitch. The multivibrator circuit 21 of FIG. 1 oscillates in response due to unavoidable mismatch of circuit elements as is well known. FIG. 2 shows the central office represented by broken block 100, a representative station network as block 101, and a hookswitch as 102.

In practice, an additional switch arrangement (not shown) is connected electrically in series with the network 101. This arrangement is operative to disconnect the transmitter portion of the network when outdialing occurs, for example, from a bubble repertory dialer powered by a power supply as shown in FIG. 1. This operation reduces power to the transmitter thus making more available to the multivibrator.

What has been described herein is considered merely illustrative of the principles of this invention. Accordingly, various modifications thereof can be devised by those skilled in the art in accordance with the principles within the spirit and scope thereof and encompassed by the following claims.

What is claimed is:

1. For connection to a source of varying electrical characteristics, a multivibrator circuit responsive to said characteristics for providing a constant a-c current output, said circuit including first and second electrical paths including first and second constant-current devices and first and second switches, respectively, and means for driving said first and second switches to open and closed or closed and open conditions in the alternative; wherein
   said first and second constant-current devices and first and second switches comprise first and second transistors in said first and second electrical paths, respectively, and means for operating said transistors in a constant-current mode;
   in combination with a rectifier circuit for providing a constant d-c current and a first capacitor responsive to said d-c current for providing a constant voltage, said combination also including a regulator circuit responsive to variations in said constant voltage for adjusting said constant a-c current output.

2. A circuit in accordance with claim 1 also including a capacitor circuit including a second capacitor responsive to said constant-current for providing a constant voltage.

3. A power supply circuit including a multivibrator having first and second transistors each with emitter base and collector electrodes for supplying a constant a-c current from a source with widely varying electrical characteristics, said source having a power and a common line, a transformer having primary and secondary windings each having a center tap, said power line being connected to said center taps and said common line being connected to said emitter electrodes of said first and second transistors, said collector electrodes and said base electrodes being connected across said primary winding and said secondary winding respectively, said circuit also including a constant-current diode connected between said center taps for maintaining a constant current at each of said collector electrodes.

4. A power supply circuit in accordance with claim 3 also including a regulator circuit and a capacitor circuit including a capacitor, said regulator circuit being responsive to variations in voltage across said capacitor for adjusting said constant a-c current to maintain said voltage across said capacitor at a first value.

5. A power supply arrangement comprising a source of varying electrical characteristics and a circuit responsive to said characteristics for providing a constant a-c current output, said circuit including a transformer having primary and secondary windings each having a center tap and first and second transistors each having emitter base and collector electrodes, said source being connected between said emitter electrodes and said center taps, said collector electrodes and said base electrodes being connected across said primary and secondary winding respectively, and a constant-current diode connected between said center taps in a manner to maintain constant-current values at said base electrodes, and means for selectively disconnecting said circuit from said source.

* * * * *